US008890345B2

(12) United States Patent
Oosterling

(10) Patent No.: US 8,890,345 B2
(45) Date of Patent: Nov. 18, 2014

(54) TURBINE WITH POWER CONVERSION UNITS WITH COUPLING MEANS

(75) Inventor: Pieter Adriaan Oosterling, Waterlandkerkje (NL)

(73) Assignee: Dutch Rainmaker B.V., Leeuwarden (NL)

( * ) Notice: Subject to any disclaimer, the term of this patent is extended or adjusted under 35 U.S.C. 154(b) by 783 days.

(21) Appl. No.: 12/737,848

(22) PCT Filed: Aug. 19, 2009

(86) PCT No.: PCT/EP2009/060734
§ 371 (c)(1),
(2), (4) Date: Feb. 22, 2011

(87) PCT Pub. No.: WO2010/023142
PCT Pub. Date: Mar. 4, 2010

(65) Prior Publication Data
US 2011/0148111 A1  Jun. 23, 2011

(30) Foreign Application Priority Data

Aug. 28, 2008  (EP) .................................. 08163198
Oct. 29, 2008  (EP) .................................. 08167878

(51) Int. Cl.
*F03D 9/00*  (2006.01)
(52) U.S. Cl.
USPC .......................................................... 290/44
(58) Field of Classification Search
USPC .................. 290/44, 55; 415/4.2, 4.1; 416/405
See application file for complete search history.

(56) References Cited

U.S. PATENT DOCUMENTS

| 2,539,862 | A | * | 1/1951 | Rushing | 62/230 |
| 3,007,054 | A | * | 10/1961 | Drake | 290/40 R |
| 3,314,594 | A | * | 4/1967 | Rietdijk | 92/48 |
| 3,806,733 | A | * | 4/1974 | Haanen | 290/55 |
| 3,952,723 | A | * | 4/1976 | Browning | 126/247 |
| 4,124,182 | A | * | 11/1978 | Loeb | 244/153 R |
| 4,229,661 | A | * | 10/1980 | Mead et al. | 290/44 |
| 4,447,738 | A | * | 5/1984 | Allison | 290/44 |
| 4,476,851 | A | * | 10/1984 | Brugger et al. | 126/247 |
| 4,498,017 | A | * | 2/1985 | Parkins | 290/44 |

(Continued)

FOREIGN PATENT DOCUMENTS

| DE | 601 986 | 10/1934 |
| DE | 739 482 | 9/1943 |
| FR | 683 949 | 6/1930 |
| FR | 683949 | 6/1930 |

*Primary Examiner* — Julio C. Gonzalez
(74) *Attorney, Agent, or Firm* — Amster, Rothstein & Ebenstein LLP

(57) ABSTRACT

The invention concerns a turbine driving a power conversion means, the power conversion means comprising several power conversion units, preferably of approximately similar power conversion capacity, that have coupling means for coupling the power conversion units to the turbine, the turbine having measuring means for determining the rotation speed of the turbine and/or a flow speed of the turbine driving flow of wind or water and a control system for controlling the coupling means in dependence of the determined rotation speed and/or flow speed. In accordance with the invention the control system has means for activating and deactivating the coupling means for the different the power conversion units so that the power conversion units are used equally.

19 Claims, 8 Drawing Sheets

(56) References Cited

U.S. PATENT DOCUMENTS

Figure 1:
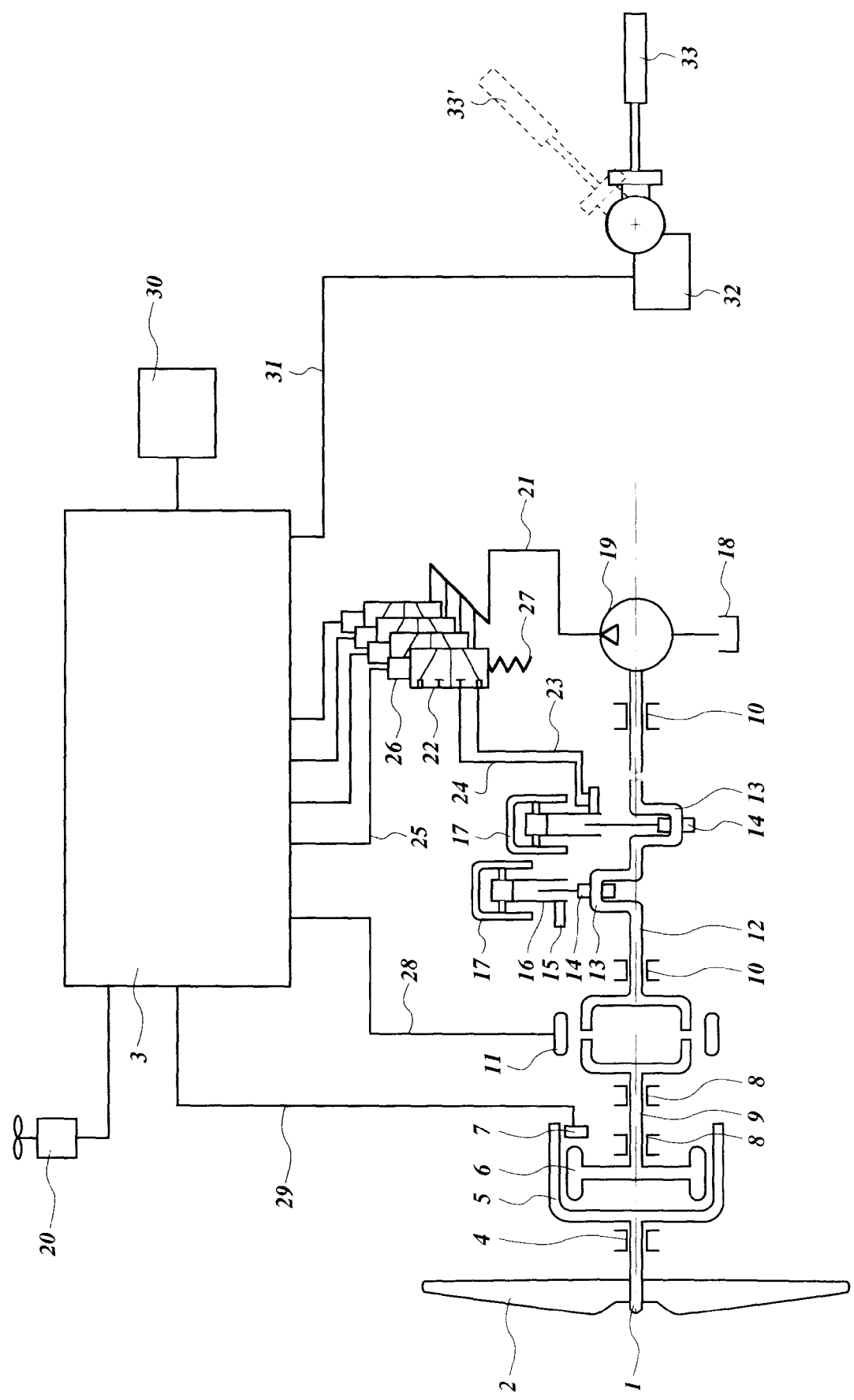

| | | |
|---|---|---|
| 6,401,691 B1* | 6/2002 | Kawano et al. ............... 123/456 |
| 7,728,446 B2* | 6/2010 | Hofbauer et al. ............. 290/1 A |
| 2002/0128748 A1* | 9/2002 | Krakovich et al. ........... 700/286 |
| 2005/0012339 A1* | 1/2005 | Mikhail et al. ................. 290/44 |
| 2007/0132247 A1* | 6/2007 | Galayda et al. ................ 290/44 |
| 2008/0196410 A1* | 8/2008 | Primlani .................... 60/641.15 |
| 2010/0060013 A1* | 3/2010 | Csefko ........................... 290/55 |
| 2010/0301613 A1 | 12/2010 | Oosterling |

* cited by examiner

TURBINE WITH POWER CONVERSION UNITS WITH COUPLING MEANS

CROSS-REFERENCE TO RELATED APPLICATIONS

This application is a national stage entry under 35 U.S.C. §371 of PCT International Patent Application No. PCT/EP2009/060734, filed Aug. 19, 2009, and claims priority to European Patent Application No. EP 08163198.8, filed Aug 28, 2008, and European Patent Application No. EP 08167878.1, filed Oct. 29, 2008, the contents of which are incorporated herein by reference in their entirety into the subject application.

The invention concerns a turbine in accordance with the preamble of claim 1. Such turbines are known, for instance from DE 601986. This document shows a wind turbine driving several compressors for compressing gas. The number of active compressor units and the torque taken from the wind turbine changes dependent on the rotation speed of the wind turbine. However, the compressor units are switched on one after the other in a fixed sequence. This leads to wear of the power conversion units, in this case compressors that are switched on at low rotation speeds or flow speeds as they are used far more frequent than the other units. For instance the power conversion units that are switched on at high speeds will have little wear. In this way the power conversion units have a too short span of life as the power conversion units switched on starting at low speeds, limit the span of life of the total.

In order to overcome this disadvantage the turbine is in accordance with claim 1. By equally spreading the use of the power conversion units over time the span of life of the power conversion means can increase considerably, for instance it can be twice or thrice as long.

In accordance with an embodiment, the turbine is according to claim 2. In this way the control system can accurately follow the use of the power conversion units, so that the consequences of a prevailing rotation and/or flow speed can be compensated.

In accordance with an embodiment, the turbine is according to claim 3. In this way the control system can be of a simple design and the use of a power conversion units are randomly chosen.

In accordance with an embodiment, the turbine is according to claim 4. In this way a group of smaller generators are used to generate electricity. Several smaller generators reduce the risk of break down, as break down of one generator does not end the power conversion as another generator can take its place. This means that more power that can be generated by the turbine is available for use. The smaller generator also makes a higher efficiency possible as the air gap between the rotor and stator can be smaller due to the smaller diameter of the generator. The smaller air gap leads to in increased performance of the generator.

In accordance with an embodiment, the turbine is according to claim 5. In this way the compressors are activated and deactivated by stopping the movement of the pistons, so that there is no loss caused by gas flowing in and out of the compression chamber.

In accordance with an embodiment, the turbine is according to claim 6. In this way at low rotation speed and/or turbine driving flow speed, the turbine can rotate free and without any load so that it can speed up from stand still or low rotation speed, where the turbine has a very low efficiency to a rotation speed whereby the efficiency of the turbine is improved. As soon as the turbine reaches a minimum rotation speed, whereby the turbine has a sufficient efficiency, the first switchable coupling couples the rotation of the turbine shaft and the compressor shaft. As long as the rotation speed remains above the minimum rotation speed, these shafts remain coupled. If the turbine driving flow speed is insufficient to maintain the turbine above the minimum rotation speed the first switchable coupling uncouples the shafts so that the turbine is free to rotate and can accelerate again. If at the increased rotation speed with increased efficiency of the turbine, the turbine generates sufficient power to maintain the rotation speed above the minimum rotation speed or accelerates even further, the turbine shaft and the compressor shafts remain coupled and the available turbine driving flow is used for driving the compressors.

In accordance with an embodiment, the turbine is according to claim 7. In this way the compressor can have one or more active pistons that are activated by the second switchable coupling and so the torque needed for rotating the compressor can be increased by activating more pistons or vice versa. The turbine driving flow is used in the most efficient way as the power requirement of the compressor is adapted to the power generated and starting of the turbine can be easier as described before.

In accordance with an embodiment, the turbine is according to claim 8. In this way, the reciprocating frequency of the pistons is increased relative to the rotation speed of the turbine without using a gearbox or similar, which makes the design easier.

In accordance with an embodiment, the turbine is according to claim 9. In this way, the pistons maintain a sufficient reciprocating frequency at lower rotation speeds, which is suitable for turbines of larger diameter.

In accordance with an embodiment, the turbine is according to claim 10. In this way, the two cams determine the position of each piston accurately and especially during the downward movement of each piston. The downward movement of the piston causes the piston to suck gaseous refrigerant into the compression chamber. By controlling this downward movement, the filling of the compression chamber is improved so that the capacity of the compressor is increased.

In accordance with an embodiment, the turbine is according to claim 11. In this way, it is easy to connect the second coupling with a control system.

In accordance with an embodiment, the turbine is according to claim 12. In this way, a single cam drives the piston which is more simple.

In accordance with an embodiment, the turbine is according to claim 13. In this way, a simple, stationary device decouples the movement of the piston and the turbine.

In accordance with an embodiment, the turbine is according to claim 14. In this way, in embodiments wherein the decoupling can be activated only in a specific position of the piston, such as for instance in the top dead centre, this decoupling can be accomplished at a later moment by slowly rotating the compressor shaft. This may be required after an emergency standstill of the turbine or in other situations whereby decoupling could not take place during slow down of the turbine.

In accordance with an embodiment, the turbine is according to claim 15. In this way, the piston can be at standstill for a short time in the position with the volume of the compression chamber as small as possible. This makes it easier to lock the piston due to its longer stationary position. In addition, the piston can be at a standstill for a short time in the position with the volume of the compression chamber as large as possible. This creates more time for gas filling the compression chamber to flow into the chamber, so that the piston compresses more refrigerant for each stroke.

In accordance with an embodiment, the turbine is according to claim 16. In this way, the compression chamber enlarges at a slower speed so that suction of the refrigerant into the compression chamber requires less energy and the force for enlarging the compression chamber can be less. In case that a spring generates this force this spring can be weaker, so that when the refrigerant in the compression chamber is compressed the less force is required for compressing the spring and the force for compression is weaker too. This reduces the power requirement for compression.

In accordance with an embodiment, the turbine is according to claim 17. In this way there is no risk that refrigerant leaks through a rotating seal.

In accordance with an embodiment, the turbine is according to claim 18. In this way, the first switchable coupling is simple and can even be located outside the enclosure.

In accordance with an embodiment, the turbine is according to claim 19. In this way, there is at almost no additional costs always sufficient auxiliary electric power available to supply the control system and to supply other auxiliary parts with electric power.

Figure 2:
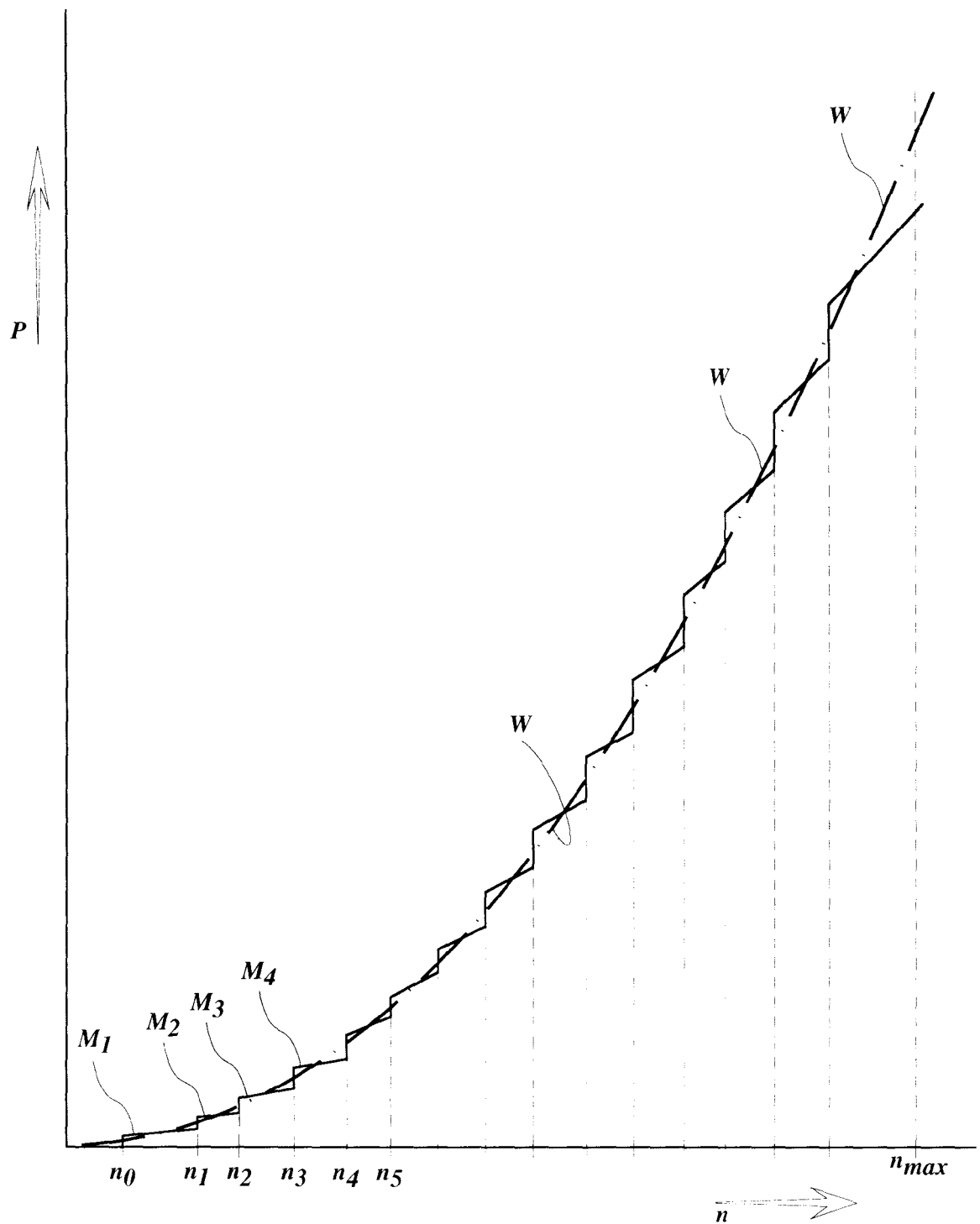
Figure 3:
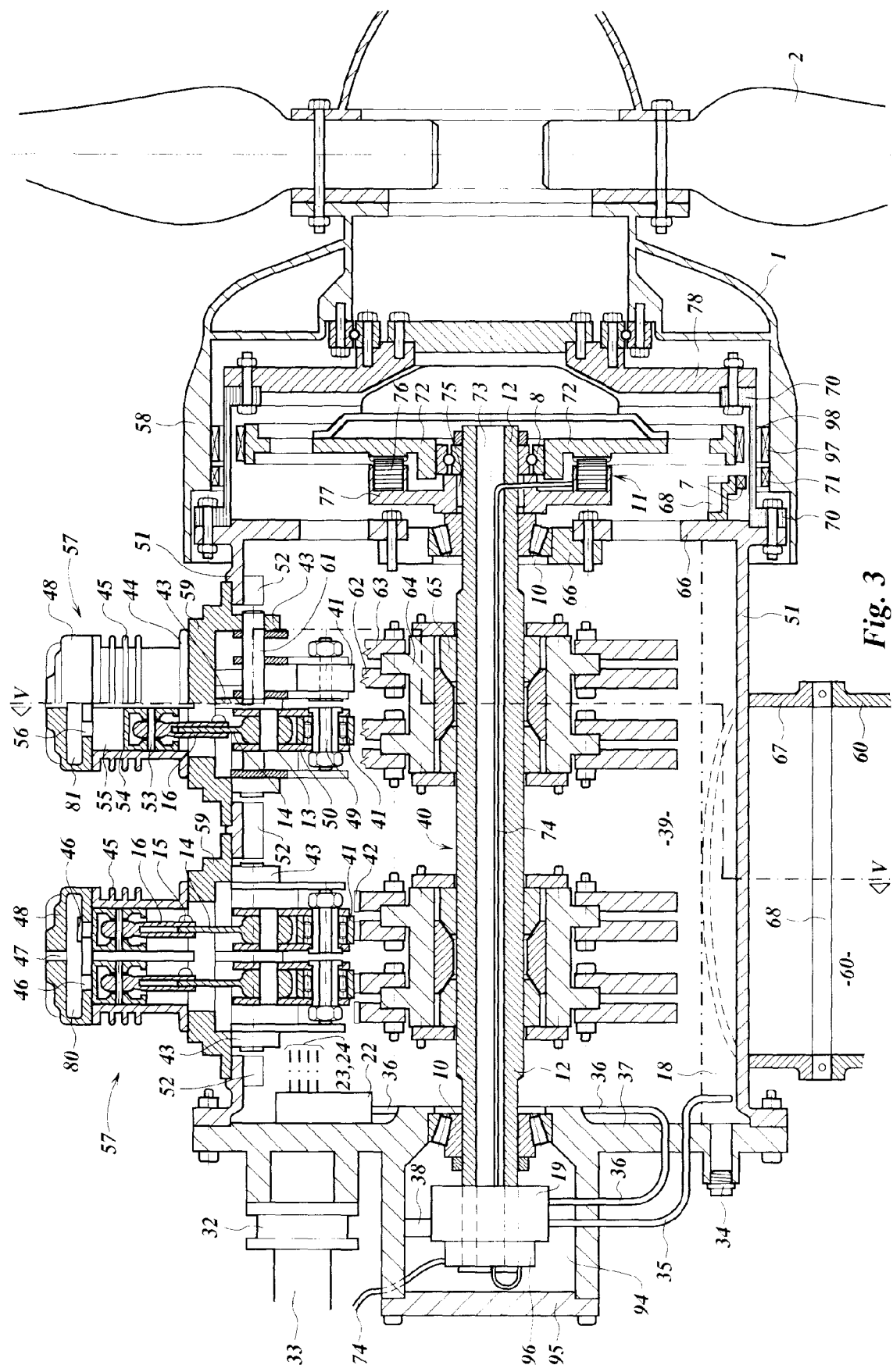
Figure 4:
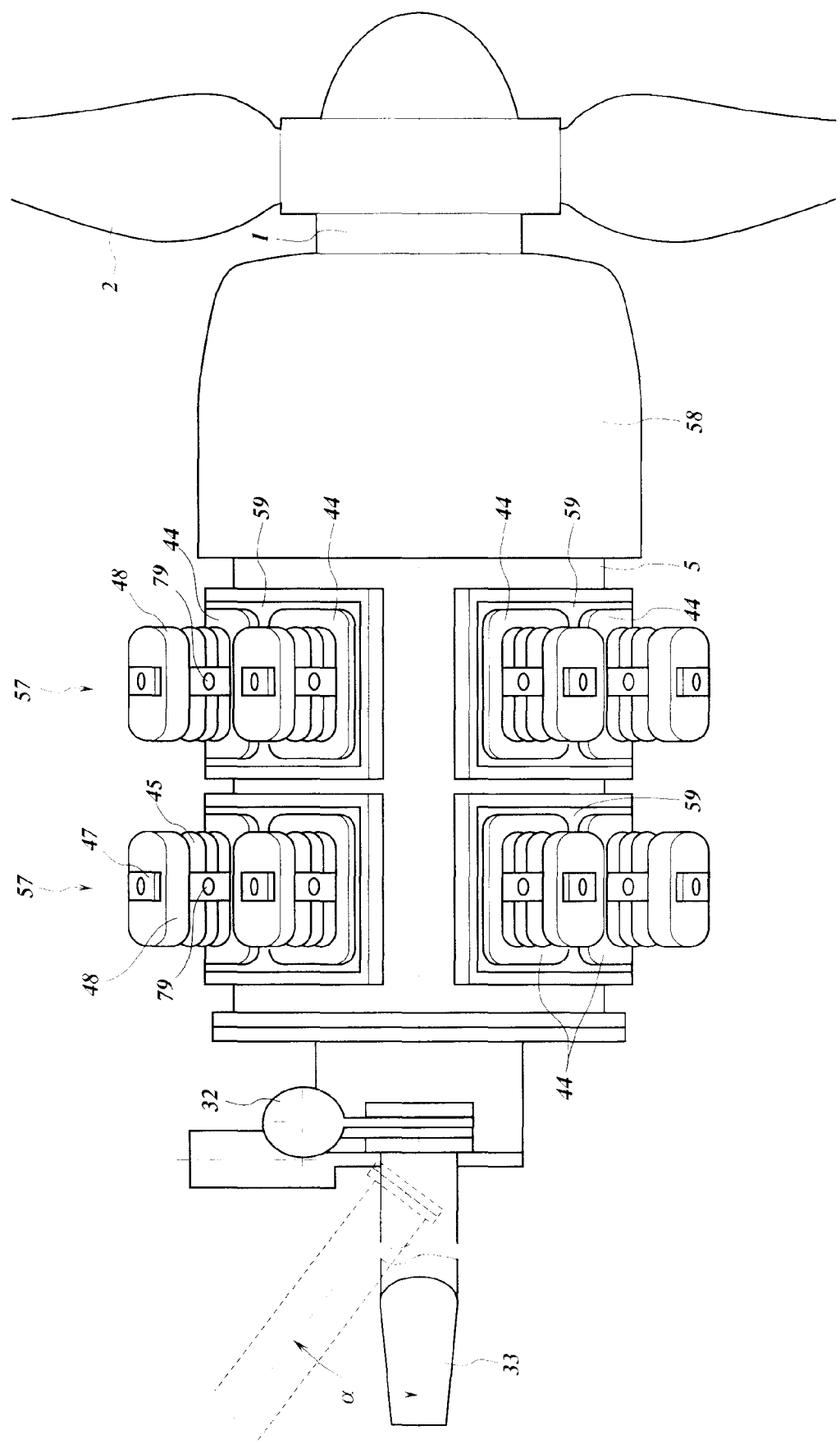
Figure 5:
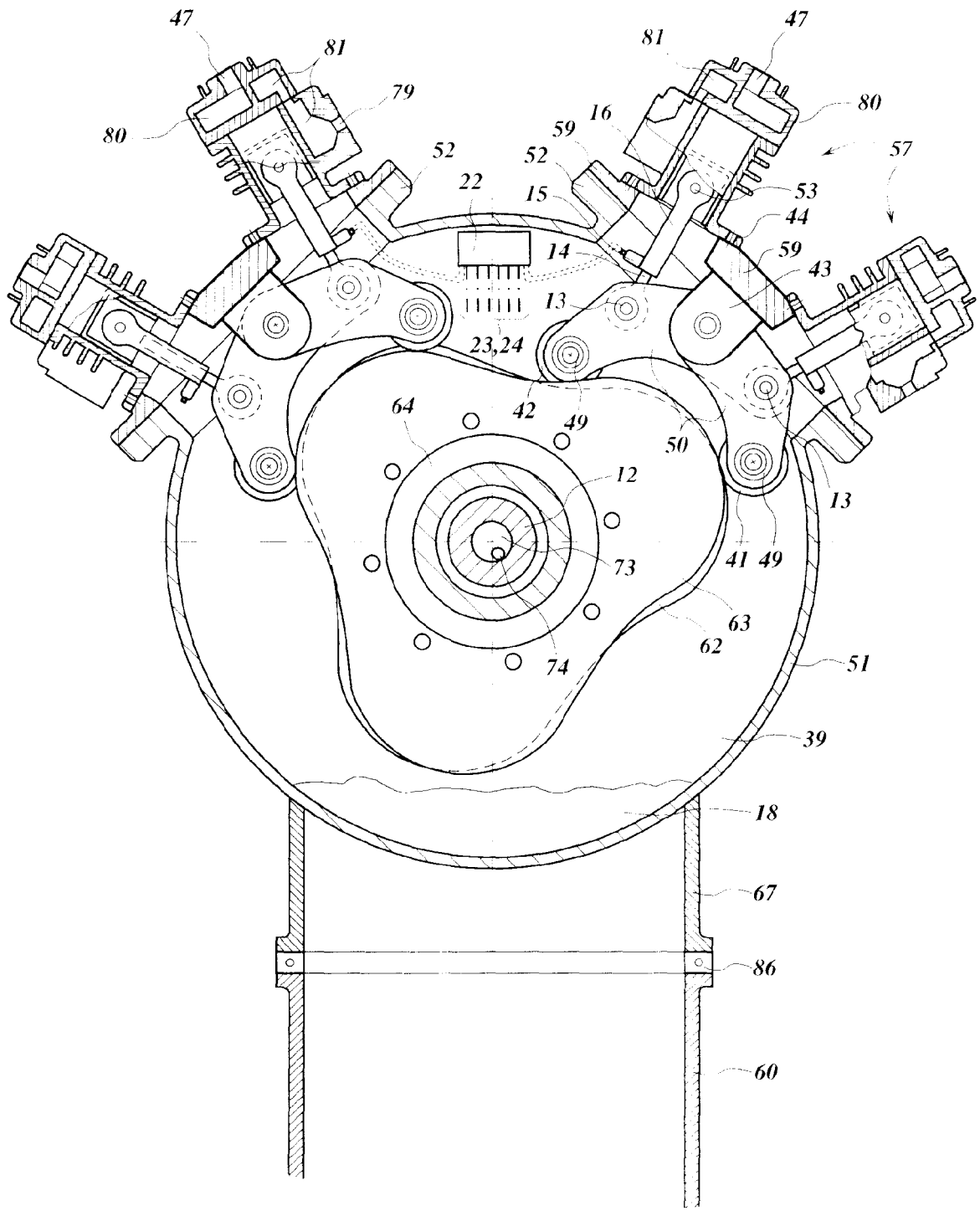
Figure 6:
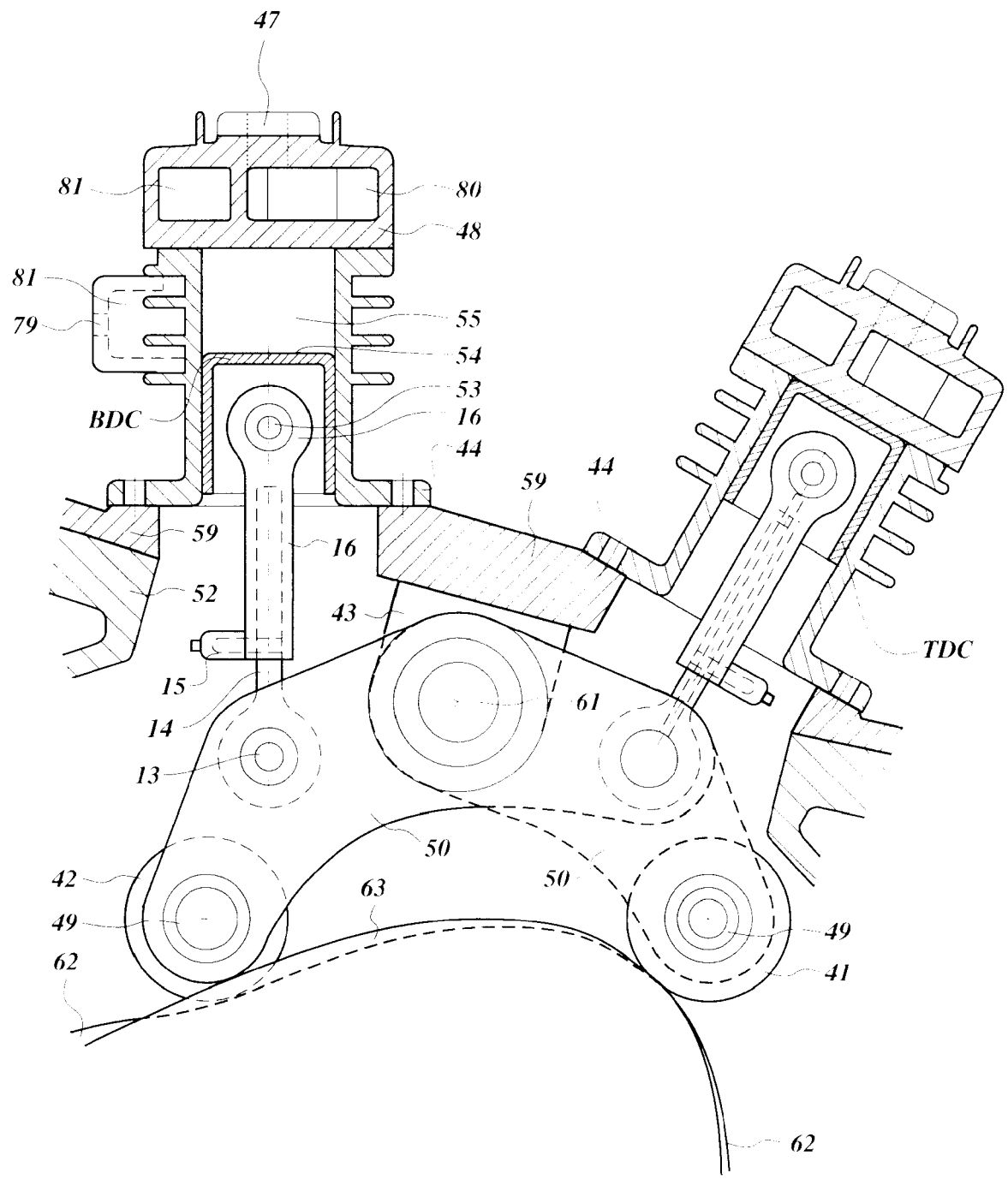
Figure 7:
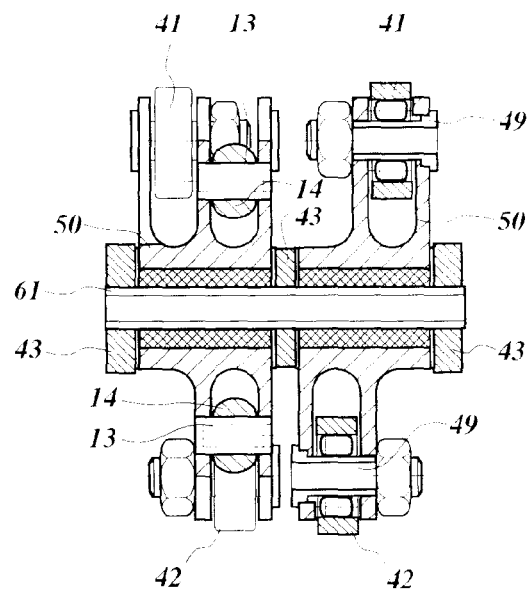
Figure 8:
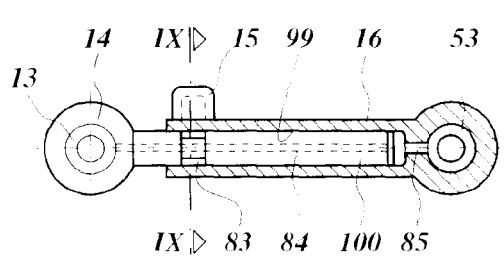
Figure 9:
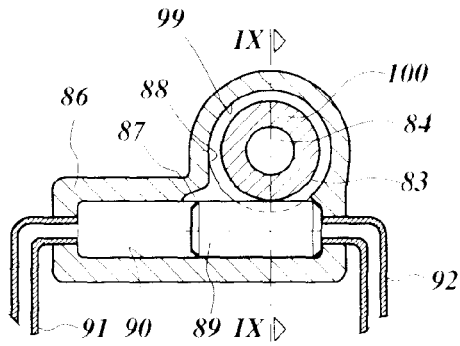
Figure 10:
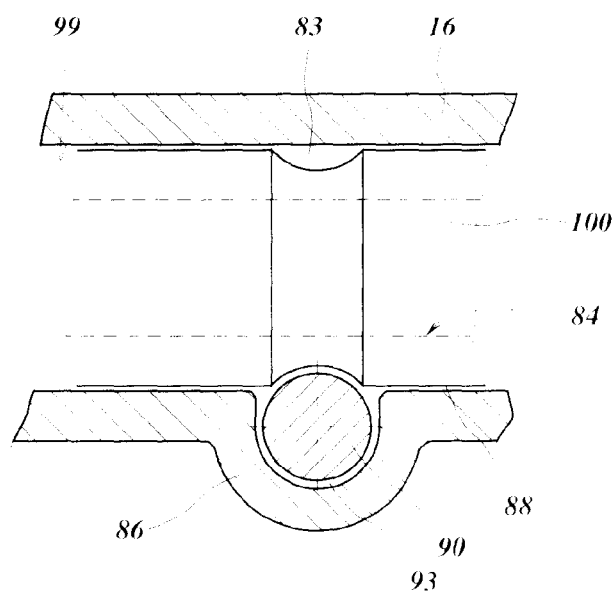
Figure 11:
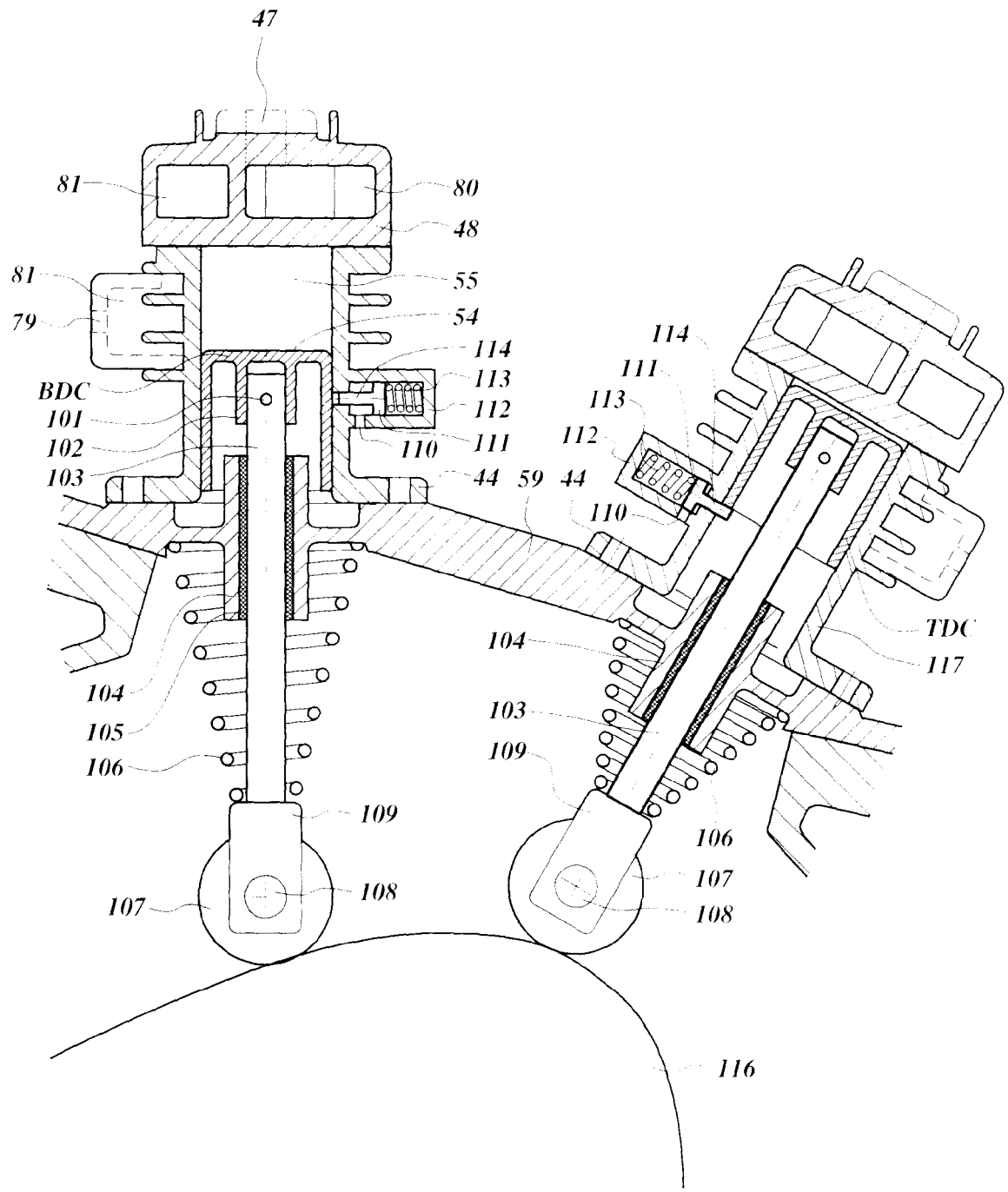

Embodiments of the invention are described with the aid of the accompanying drawings in which FIG. 1 shows a functional diagram of a reciprocating compressor driven by a wind turbine for compressing refrigerant, FIG. 2 shows in a diagram the settings of the reciprocating compressor in dependence of its rotation speed, FIG. 3 shows a vertical section of the turbine driven reciprocating compressor, FIG. 4 shows a top view of the turbine driven reciprocating compressor of FIG. 3, FIG. 5 shows section V-V of the turbine driven reciprocating compressor of FIG. 3, FIG. 6 shows a detail of FIG. 5, FIG. 7 shows a partial section a view of an oscillating bracket as shown in FIGS. 3 and 5, FIG. 8 shows a longitudinal section of a connection rod assembly, FIG. 9 shows section IX-IX of FIG. 8, FIG. 10 shows section X-X of FIG. 9 and FIG. 11 shows a further embodiment with a detail that is similar to the detail shown in FIG. 6.

FIG. 1 shows a functional diagram of a wind turbine with turbine blades 2 coupled to a turbine shaft 1 that rotates in a turbine shaft bearing 4. The turbine shaft 1 of the wind turbine has an outer coupling half 5 that rotates an inner coupling half 6 which is mounted on a coupling shaft 9 that rotates in a coupling shaft bearing 8. A switchable coupling 11 couples the coupling shaft 9 to the compressor shaft 12. The compressor shaft 12 rotates in a compressor shaft bearing 10 and drives a pump 19 and has crank pins 13 that are coupled to an inner connecting rod 14. Each inner connecting rod 14 has a connecting rod coupling 15 for coupling the inner connecting rod 14 to an outer connecting rod 16. The outer connecting rod 16 is fastened to a piston 17 that can move reciprocatingly in a cylinder and so compress refrigerant.

A control system 3 is designed to control the settings of the refrigerant compressor. The control system 3 is coupled with an AC feed and signal cable 29 to a coil 7 for measuring the rotation speed of the turbine shaft 1 and the blades 2. Permanent magnets (not shown) are mounted on the outer coupling half 5 and are used for detecting the rotation speed as they move along the coil 7. The moving permanent magnets also generate electric power in the coil 7, which electric power can be stored in a reloadable accumulator 30. The control system 3 has also a wind speed sensor 20 for measuring the wind speed. A signal line 28 connects the control system 3 to the switchable coupling 11 and controls the coupling of the rotation of the coupling shaft 9 to the compressor shaft 12. A signal line 25 connects the control system 3 to an actuator 26 of a switchable valve 22, in this embodiment there is a switchable valve 22 for each connecting rod coupling 15. In other embodiments one switchable valve 22 can control several connecting rod couplings 15.

The switchable valve 22 has a spring 27 that counteracts the actuator 26. The switchable valves 22 connect either a first oil supply line 23 or a second oil supply line 24 to a pressure side of the pump 19 and so control the settings of the connecting rod coupling 15. In this embodiment the spring 27 arranges a presetting of the connecting rod coupling 15 in such a way that the inner connecting rod 14 and the outer connecting rod 16 can move relative one another and that the piston 17 does not move when the compressor shaft 12 rotates. When the actuator 26 is activated by the control system 3 the connecting rod coupling 15 couples the movement of the inner connecting rod 14 and the outer connecting rod 16 so that the piston 17 moves reciprocatingly in a cylinder and the refrigerant is compressed.

A signal line 31 connects the control system 3 with a vane actuator 32. The vane actuator 32 controls the setting of the vane 33 whereby during normal operation the rotation axis of the blades 2 directs in the wind. If for instance the wind speed sensor 20 detects that the wind speed is too high, the vane actuator 32 moves the vane 33 so that the blades 2 rotate from the wind and the rotation of the blades 2 stops and no damage can occur to the blades 2.

FIG. 2 shows in a diagram how the control system 3 controls the settings of the refrigerant compressor in order to use the available wind power most advantageously. In the diagram, a dash-dot line W shows a maximum power P that the blades 2 can generate in dependence of a rotation speed n of the blades 2. The maximum power P generated by the blades 2 depends on the wind speed and for each wind speed the efficiency of the blades 2 has the highest value at a specific rotation speed n of the blades 2 and so each rotation speed n has a maximum value that can be generated at that rotation speed n by the blades 2. If the power P taken from the blades 2 is higher than the power generated by the wind, the rotation speed n of the blades 2 will decrease and vice versa. The refrigerant compressor makes the best use of the available wind power P if at a certain rotation speed n of the blades the power taken P from the blades 2 is approximately equal to the power P generated by the wind. By switching the connecting rod couplings 15, the various pistons 17 are switched on or off, whereby at an increasing rotation speed n an increasing number of pistons 17 are active.

The increase in the number of active pistons 17 causes an increase in a torque M that is required for rotating the compressor shaft 12 and the lines $M_1, M_2, M_3, M_4, \ldots$ indicate for the rotation speed areas $n_0\text{-}n_1, n_1\text{-}n_2, n_2\text{-}n_3, n_3\text{-}n_4, \ldots$ the power requirement of the reciprocating compressor. Because of adapting the number of active pistons 17 in dependence of the rotation speed n, the power requirement of the reciprocating compressor and the available power from the turbine are approximately equal over the whole range of use. In this way, the rotation speed n follows the available wind power P and all available wind power P is used for compressing refrigerant while avoiding unnecessary losses.

FIG. 2 shows that the torque M for driving the compressor increases in sixteen steps to its maximum value. It will be clear to the skilled man that the number of steps depends on the design of the reciprocating compressor and can have any value, but is preferably more than three.

In situations where the wind speed is low, it is difficult to start the rotation of the blades 2, as the torque generated by the blades 2 is lower when the blades 2 are at a standstill than when they rotate at a rotation speed n that is suitable for the current wind speed. In order to facilitate the start of rotation of the blades 2 at rotation speed n of the blades that is lower than a minimum active speed $n_0$ the switchable coupling 11 uncouples the rotation of the blades 2 and the rotation of the compressor shaft 12. As soon as the rotation speed of the blades 2 is higher than the minimum active speed $n_0$ the switchable coupling 11 starts rotating the compressor shaft 12 and the pump 19 generates an oil flow towards the connecting rod couplings 15 so that the connecting rods 14,16 are lubricated.

If the rotation speed remains higher than the minimum active speed $n_0$ for a sufficiently long period, the connecting rod coupling 15 activates a first piston 17. After the rotation speed remains higher than a first active speed $n_1$ for a specific period, the second piston 17 is activated and so on. In the situation whereby the rotation speed n of the blades 2 is higher than a maximum active speed $n_{max}$ or the wind speed measured by the wind speed sensor 20 gets too high, there is danger for damage to the blades 2. The control system 3 activates the vane actuator 32 which actuator positions the vane 33 in position shown with reference number 33' and as a result of the forces on the vane 33 the blades 2 rotate off wind. After the wind speed sensor 20 detects that the wind speed has lowered sufficiently the vane actuator 32 brings the vane 33 in its active position and the reciprocating compressor is in use again.

The control system 3 that controls the setting of the switchable coupling 11, the connection rod couplings 15 and the vane 33 has a program that uses the information from the coil 7 and the wind sensor 20. The information from these sensors 7, 20 can be used immediately in order to prevent undesirable situations such as overspeed. For preventing a too frequent switching of the switchable coupling 11 and the connecting rod couplings 15 the information from the sensors 7, 20 can be filtered to an average value and/or integrated and/or differentiated for use in the program.

In order to spread the wear of the compressors evenly over all compressors, the control system 3 has means to ensure that the connection rod couplings 11 are actuated in a way that the compressors have an approximately equal service life. For this the control system 3 can include a memory that records the use of each compressor and a program that activates the compressor that has the fewest hours of use when the rotation speed of the fluid flow increases. Also the program can be set to deactivate the compressor that has the most hours of use when the rotation speed of the fluid flow decreases. The memory that records the use of each compressor can also be used for maintenance purposes and delay the use of compressor when it is due for inspection or maintenance or when sensors (not shown) indicate that one or more parts of the compressor should be inspected.

The program could include a module that switches of further use of a compressor if it has a breakdown. This would limit the use of the turbine at the highest rotation speed or fluid flow as this limits the power that can converted. as the highest rotation speed or fluid flow do not happen often, more available power in the turbine would be advantageously used than in situations where a breakdown of a component would lead to shut down of the turbine.

Instead of recording the use of each compressor for determining whether a compressor should be switched on or off, the switching on and off can be done randomly. This means that the control system 3 activates and deactivates the connection rod couplings 11 randomly so that after a long period all compressors will have an approximately equal service life.

In the described embodiment, the vane 33 sets the blades 2 to the wind. In other embodiments, there is a separate drive for directing the blades 2 to the wind, whereby there is also a vane for measuring the wind direction. In such embodiments, the control system 3 sets the blades 2 in direction of the wind during normal operation or turns the blades 2 from the wind at too high wind speeds.

The disclosed embodiment concerns a wind turbine that generates power from wind of varying strength. The same or similar construction of the reciprocating compressor is suitable for use in situations whereby the turbine generates power from by water of varying quantity or pressure, so that also in that situation the available energy is used in the best way.

The turbine that generates power from air flow or water flow of varying strength can drive other power converting equipment, such as several electricity generators. Generators can be switched on and off using electric switches and switching the smaller generators on and off effects the gradual increase and decrease respectively in the power conversion capacity of the generators driven by the turbine. The control system 3 has a program as described earlier for switching the generators on and off.

The disclosed embodiment concerns a reciprocating compressor for compressing refrigerant. The refrigerant is used in a evaporator for cooling an air flow or condensing vapour to water. The publication WO 2004/099685 describes an application of the refrigerant compressor for use in condensing vapour. It will be clear that the reciprocating compressor can also be used for other applications such as compressing air to a high pressure whereby pressurized air can be used for driving hand tools or for other applications.

FIGS. 3-10 show in various views an embodiment of the reciprocating compressor that functions as described earlier, whereby the same or similar parts have the same reference numbers as indicated in the schematic diagram.

A bearing 68 is located on top of a tower 60 and supports a cylindrical support 67 that supports an enclosure 51 and that can rotate around the vertical axis of the bearing 68. At the side of the blades 2 the enclosure 51 has a bearing support 66 in which the first bearing 10 is mounted and at the side away from the blades 2 the enclosure 51 has a back cover 37 with the second bearing 10. The bearings 10 support the compressor shaft 12. The back cover 37 has at the side away from the first bearing 10 a recess 94 through which the second bearing 10 is accessible and in which the pump 19 and a collector ring 96 are mounted on the compressor shaft 12. A support bracket 38 prevents rotation of the pump 19 and the collector ring 96 and a cover 95 closes the recess 94. A ring 70 of synthetic material is mounted at the front side of the enclosure 51 and a front cover 78 is attached to the ring 70 so that the enclosure 51 is closed at the front side. The enclosure 51, the ring 70, the front cover 78, the back cover 37 and the cover 95 form an interior housing 39 in which the compressor shaft 12 can rotate and that is gas tight without the need of rotating seals for the compressor shaft 12.

The turbine shaft bearing 4 is mounted on the front cover 78 and the turbine shaft 1 can rotate around the turbine shaft bearing 4. The turbine shaft 1 continues in the backwards direction as a hood 58 around the ring 70. The hood 58 has an inside rim of permanent magnets 97. A coupling disc 72 is mounted with the coupling shaft bearing 8 on the compressor shaft 12, the coupling disc 72 has at its outside circumference an outside rim of permanent magnets 98. The outside rim of permanent magnets 98 cooperates with the inside rim of permanent magnets 97 through the ring 70 and so couples the rotation of the blades 2 at the outside of the interior housing 39 with the rotation of the coupling disc 72 inside the interior housing 39. In order to enable the permanent magnets 97 and 98 to couple the ring 70 has no magnetic resistance and is magnetically inert. The ring 70 can be from pure no-carbon stainless steel, from other non-magnetic metals or from a plastic material. The switchable coupling 11 can couple the rotation of the coupling disc 72 via coupling plates 76 with a coupling disc 77. The rotation of the coupling disc 77 is coupled via a key 75 to the rotation of the compressor shaft 12 mounted inside the interior housing 39. A cable 74 through the hollow compressor shaft 12 connects the coupling 11 via the collector ring 96 to the control system 3. The control system 3 can activate the coupling plates 76 and so couple the rotation the coupling discs 72 and 76 so that the blades 2 rotate the compressor shaft 12.

A ring of permanent magnets 71 is mounted on the inside surface of the hood 58. The ring of permanent magnets 71 moves along the coil 7 that is mounted on a bracket 69 inside the inner housing 39. The ring of permanent magnets 71 generates a pulsating current in the coil 7, this current is used to load the reloadable accumulator 30 (see FIG. 1) and also to determine the rotation speed of the blades 2. In this embodiment, the bracket 69 with the coil 7 is located inside the interior housing 39 in order to prevent contamination of the coil 7 but this is not necessary. The bracket 69 could for instance be located on the front cover 78. The coil 7 can generate electricity that is available for auxiliary systems whereby the generated power can be as much as 10-15% of the power generated by the blades 2.

In the described embodiment the outside rim of permanent magnets 97 and the inside rim of permanent magnets 98 are permanently coupled and the switchable coupling 11 couples and decouples the rotation of the compressor shaft 12 and the turbine shaft 1. In another embodiment, there is a metallic ring between the outside rim of permanent magnets 97 and the inside rim of permanent magnets 98, which metallic ring can move between two axial positions. In the first axial position, the metallic ring is between the two rims 97, 98 and there is no coupling of the rotation as the metallic ring prevents the magnets attracting one another. An actuator can move the metallic ring to a second position whereby the metallic ring is not between the two rims 97, 98 so that the rings of permanent magnets 97,98 couple the rotation of the compressor shaft 12 and the turbine shaft 1. In another embodiment, an actuator moves the inside rim of permanent magnets 98 or the outside rim of permanent magnets 97 between two axial positions for coupling and decoupling the rotation of the turbine shaft 1 and the compressor shaft 12.

As indicated above the coil 7 measures the rotation speed of the turbine and the control system 3 uses this information for activating the switchable coupling 11. In the embodiment whereby an actuator moves the metallic ring between the two rims 97, 98 a mechanism that detects the rotation speed of the blades 2 can also function as actuator for moving the metallic ring. For instance an embodiment can be designed such that the blades 2 rotate weights that move under the centrifugal forces against a spring and so move the metallic ring and couple the rotation of the compressor shaft 12 and the turbine shaft 1. In a further embodiment, the same mechanism can also move the vane 33 at too high rotation speeds. This type of mechanisms can be independent of available electrical power so the mechanism can also be installed as an emergency provision.

Between the compressor shaft bearings 10 the compressor shaft 12 has an outer surface 40 on which two cam support bodies 64 are mounted with fixed couplings 65. Each cam support body 64 supports two sets of cams, each cam set comprising a first cam 62 and a second cam 63. The first cam 62 interacts with a first cam roller 41 mounted with a roller shaft 49 in a oscillating bracket 50 and the second cam 63 interacts with a second cam roller 42 also mounted with a roller shaft 49 in the oscillating bracket 50. The oscillating bracket 50 can oscillate around an oscillating shaft 61 that is mounted in support brackets 43. In the shown embodiment, there are two oscillating brackets 50 that interact with each cam set.

The first cam 62 and the second cam 63 are designed such that they define the position of the oscillating bracket 50 accurately. During rotation of the cam set 62, 63 the oscillating bracket 50 oscillates harmoniously between two extreme positions whereby the piston 54 is in a top dead centre TDC position and a bottom dead centre BDC position (see FIG. 6) and the oscillating bracket 50 and the piston(s) coupled thereto are at a standstill in each extreme position TDC, BDC for a short duration, that means over a small rotation of the cam set 62, 63. For each rotation of the compressor shaft 12 the oscillation bracket 50 oscillates three times between extreme positions so that the oscillation frequency of the bracket 50 is three times the rotation frequency of the blades 2.

It will be clear that the oscillation frequency of the bracket 50 relative the rotation speed of the blades 2 can be changed by changing the shape of the cam set 62, 63, the cam set 62, 63 can for instance have two, four or five lobs instead of the three that are shown in this embodiment. The number of lobs depends on the maximum rotation speed of the blades 2 and so on the blade diameter. At a larger diameter of the blades 2 there are more lobs on the cam set 62, 63 so that a reciprocating piston 54 moves at a sufficiently high frequency.

The support brackets 43 are part of a mounting plate 59, the mounting plate 59 is mounted on a support flange 52 that forms a rim around an opening in the enclosure 51. A cylinder-connecting flange 44 couples two double cylinders 57 to the mounting plate 59. Each double cylinder 57 has two compression chambers 55 in which the piston 54 can harmoniously move between a top position (top dead centre TDC) and a bottom position (bottom dead centre BDC). A cylinder head 48 closes the compression chambers 55 at the top. A piston pin 53 fastens the outer connecting rod 16 to the piston 54. The crank pin 13 couples the inner connecting rod 14 to the oscillating bracket 50. The inner connecting rod 14 has a pin 100 (see FIGS. 8-10) that can slide in a cylinder 99 (see FIGS. 8-10) of the outer connecting rod 16 whereby the connecting rod coupling 15 can couple the movement of the inner connecting rod 14 and the movement of the outer connecting rod 16 by blocking the sliding. In FIG. 3 the double cylinder 57 shown at the left side of the figure shows the inner connecting rod 14 and the outer connecting rod 16 in an uncoupled situation so that they can move relative one another. The double cylinder 57 at the right side shows coupled connecting rods 14, 16; for further details see hereafter in the description of the FIGS. 8-10.

A first oil supply line 23 and a second oil supply line 24 connect each connecting rod coupling 15 via a switchable valve 22 to the pressure line 36 of the pump 19. The switchable valves 22 are mounted on the back cover 37 and as the connecting rod couplings 15 move with the piston 54 the oil supply lines 23, 24 are partly made of flexible material in order to connect them to the switchable valve 22. When the compressor shaft 12 rotates the oil pump 19 always pumps oil through either one of the oil supply lines 23, 24 so there is a continuous oil supply to the connecting rods 14, 16 and from there to the piston pins 53 and the crank pins 13. In this way these pins 53, 13 are lubricated continuously during rotation of the compressor shaft 12. The back cover 37 has one or more oil plugs 34 for supplying oil to or draining oil from the sump 18 in the interior housing 39. The suction line 35 connects the sump 18 with the oil pump 19.

A gas inlet valve 46 connects the compression chamber 55 with a suction chamber 80 in the cylinder head 48, an inlet connection 47 connects the suction chamber 80 with pipes (not shown) that connect the reciprocating compressor with an evaporator (not shown) or with other equipment. A gas outlet valve 56 connects the compression chamber 55 with a pressure chamber 81 that is for a part in the cylinder head 48 and that continues at the side of the double cylinder 57. An outlet connection 79 connects the pressure chamber 81 to piping (not shown) that connects the reciprocating compressor with a buffer vessel (not shown) for compressed refrigerant or with other equipment. Cooling fins 45 at the side of the double cylinder 57 drain the heat away from the compressed refrigerant; the ambient absorbs the heat from the cooling fins 45.

The cam sets 62,63 are designed such that the pistons 54 dwell for a short duration at the bottom dead centre BDC, so that the compression chamber 55 can fully fill with gaseous refrigerant before the piston 54 starts its upward movement and compresses the refrigerant. In this way the capacity of the compressor is increased.

In the disclosed embodiment the two cams 62, 63 drive the oscillating bracket 50 so that the pistons 54 are positioned accurately during the compression stroke and also during the suction stroke. During this suction stroke the pistons 54 suck the refrigerant in the compression chamber 55 and accurate positioning of the piston 54 ensures that the compression chamber 55 is filled with the maximum quantity of refrigerant. If required adjustment means or resilient means mounted on the oscillating bracket 50 reduce the play between the cam rollers 41, 42 and the cams 62, 63. In another embodiment, an oscillating bracket is driving only one piston 54. In that situation it is possible that a spring effects the downward movement of the piston 54 towards the bottom dead centre BDC and that there is only one cam for pushing the piston 54 upwards towards the top dead centre TDC and compressing the refrigerant. In that situation, the cam is designed such that the piston dwells at a standstill only in its lowest position (BDC).

For directing the blades 2 to the wind vane 33 is fastened to the vane actuator 32 that is attached to the back cover 37. The vane actuator 32 can rotate the vane 33 around a vertical axis so to a position where it makes a vane angle α with the rotation axis of the blades 2. The wind then rotates the centre line of the blades 2 to a position where the centre line makes an angle with the direction of the wind and so that the blades 2 come to a standstill thereby avoiding too high rotation speeds.

FIGS. 8-10 show the connection rods 14, 16 and the connection rod coupling 15 in more detail. The pin 100 of inner connection rod 14 can move in the cylinder 99 of the outer connecting rod 16. The outer connecting rod 16 has perpendicular to the cylinder 99 a cylindrical housing 86 that encloses a cylinder 90 in which a cylindrical bolt 89 can move. At both ends of the cylinder 90 are respectively the first connector 91 and the second connector 92 to which the oil supply lines 23, 24 are coupled. The oil pressure in one of the supply lines 23, 24 moves or tries to move the cylindrical bolt 90 to a position where the cylindrical bolt intersects the pin 100 or whereby it is free of the pin 100. The pin 100 has a groove 83 that makes it possible for the cylindrical bolt 90 to intersect with the pin 100 so that it locks the pin 100 in a fixed position in the cylinder 99 and the cylindrical bolt 90 couples the movements of the inner connecting rod 14 and the outer connecting rod 16. The switchable valve 22 can be activated at any moment to couple the inner connecting rod 14 and the outer connecting rod 16 at any relative position. At that moment, the first connection 91 is pressurized and the second connection 92 is relieved from its pressure. The end of the cylindrical bolt 89 presses against the outside surface of the pin 100 and the pin 100 can slide in the cylinder 99. At a certain moment the groove 83 is in front of the cylindrical bolt 89 and the cylindrical bolt 89 slides in the groove 83 so that it locks the pin 100 in a fixed position in the cylinder 99. In this position of the cylindrical bolt 89 the piston 54 moves reciprocatingly in the compression chamber 55 and refrigerant is compressed.

Between the cylindrical bolt 90 and its cylindrical housing there is a gap 93 that makes oil flow past the cylindrical bolt possible and near the cylinder 99 there is an opening 87 that connects the cylinder 99 with a canal 88. The canal 88 is a longitudinal groove in the cylinder 99 from the cylinder 90 towards the bottom of the cylinder 99. An oil canal 85 in the outer connecting rod 16 connects the bottom of the cylinder 99 with the piston pin 53 to supply oil. An oil canal 84 in the inner connecting rod 14 connects the bottom of the cylinder 99 with the crank pin 13 to supply oil. In this way as soon as the pump 19 rotates and the first connection 91 or the second connection 92 receives oil the oil flow towards the crank pin 13 and the piston pin starts, independently of the position of the cylindrical bolt 89.

In the disclosed embodiment, the connecting rod coupling 15 couples the movement of the pistons 54 and the oscillation of the oscillating bracket 50. Other designs are possible, for instance a design whereby the oscillating bracket 50 consists of two parts rotating around the oscillating shaft 61. The rotation of these two parts is coupled by a pin on the one part that is inserted in a hole of the other part. The cam rollers 41, 42 are mounted in the one part and the pistons 54 are connected to the other part with a one piece connecting rod that connects the other part to the piston 54. By moving the pin in or out of the hole of the other part, the cam rollers 41, 42 move the pistons 54 or not. For moving the pins, various options are available. Magnetic, hydraulic or other types of actuators can move the pins under control of the control system 3.

In the earlier described embodiments the engagement and disengagement of the compressor shaft 12 and the piston 54 is located in either the oscillating bracket 50 or the connecting rod 14, 16. In a further embodiment one or more cam support bodies 65 with the cams 62, 63 rotate around the compressor shaft 12 or rotate with the compressor shaft 12 in dependence of the settings of a switchable coupling between the cam 62,63 and the compressor shaft 12, which switchable coupling can be of the same type as coupling 11. Thereby it is possible that each set of cams 62, 63 has a separate switchable coupling, and there is no switchable coupling between the compressor shaft 12 and the turbine shaft 1 but they are permanently coupled. In that situation if the reciprocating compressor has a design that is similar to the compressor shown in the FIGS. 3-7 and the switchable couplings are mounted between the cam support bodies 64 and the cam sets 62,63 the compressor has four active settings and one setting whereby the turbine can rotate freely.

FIG. 11 shows a further embodiment of the compressor. In this embodiment the piston 54 moves reciprocatingly the in a cylinder 117 and forms therewith the cylindrical compression chamber 55 and a connecting rod 103 moves with the piston 54, the piston 54 has a bush 102 in which the connecting rod 103 is inserted, the pin 101 couples the piston 54 to the connecting rod 103. The mounting plate 59 has a guide 104, in the guide 104 is a cylindrical bearing 105 in which the connecting rod 103 can move reciprocatingly. The connecting rod 103 has at the side away from the piston 54 a bracket 109 with the pin 108 around which a wheel 107 rotates. A spring 106, mounted between the bracket 109 and the mounting plate 59, pushes the piston 54 towards its bottom dead centre BDC. The wheel 17 rolls over cam 116 and pushes the piston 54 towards its top dead centre TDC. Rotating the cam 116, causes the piston 54 to move reciprocatingly in the compression chamber 55 so that the refrigerant can be compressed.

In order to uncouple the reciprocating movement of the piston 54 and the rotation of the compressor shaft the cylinder 117 has a hole 115 through which a pin 114 can be inserted, so that the pin 114 blocks the downward movement of the piston 54. The pin 140 is coupled to a piston 111, which can move in a cylinder housing 112. A spring 113 pushes the piston 111 with the pin 114 to the blocking position. The cylindrical housing 112 has an opening 110 for connecting the pressure line with pressurised fluid or air. If the control system detects that the compressor shaft rotates at a sufficient high speed, pressure is put on the opening 110 and the pin 114 is pulled out of the hole 115. The spring 106 now pushes the piston 54 downwards until the wheel 107 is against the cam 116 and the piston 54, follows the reciprocating movement of the cam 116.

In the described embodiment, the movement of the piston 54 can be decoupled from the rotation of the compressor shaft only in its top dead position TDC. This means that at decreasing wind speeds and/or decreasing rotation speed of the compressor shaft, care must be taken that the movement of the piston 54 is decoupled in time, as otherwise start of the compressor is more difficult due to a high torque requirement. In order to overcome this problem, a coupling between the turbine and the compressor shaft can be provided, so that the turbine can get a high rotation speed before it is coupled to the compressor shaft. The inertia of the turbine now rotates the compressor shaft for at least one complete revolution. During this revolution, the movements of a number of or all pistons 54 are decoupled from the rotation of the compressor shaft and the compressor will start at its lowest capacity. In another embodiment, there is a drive for rotating the compressor shaft a full revolution in the situation, that there is no or insufficient wind flow or water flow. As there is no haste for completing this full revolution, the drive can be small. During this full revolution, a number of or all pistons 54 are decoupled.

The invention claimed is:

1. Turbine driving a power conversion means, the power conversion means comprising several and preferably more than three power conversion units, of approximately similar power conversion capacity, each power conversion unit has coupling means for coupling the power conversion units to the turbine, the turbine having measuring means for determining the rotation speed of the turbine and/or a flow speed of the turbine driving flow of wind or water and a control system for controlling the coupling means in dependence of the determined rotation speed and/or flow speed characterized in that the control system has means for activating and deactivating the coupling means so that the power conversion units are used equally and disabled power control units remain switched off, wherein the power conversion units each comprise a compressor with a compression chamber (55) at one side limited by a piston (17;54) and drive means (12,14,16) for moving the piston reciprocatingly in the compression chamber between a top dead centre position (TDC) and a bottom dead centre position (BDC), and the coupling means (11; 15) couple and decouple the rotation of the turbine and the reciprocating movement of one or more pistons (17;54).

2. Turbine in accordance with claim 1 wherein the means for activating and deactivating the coupling means comprises a memory for storing past use of each power conversion unit.

3. Turbine in accordance with claim 1 wherein the means for activating and deactivating the coupling means comprises a system for randomly choosing which power conversion unit has to be switched on and/or off.

4. Turbine in accordance with claim 1, wherein one of the power conversion units is a generator for generating electric power.

5. Turbine according to claim 1, wherein the compressor comprises a compressor shaft (12) for moving one or more pistons (17;54), the turbine comprises a turbine shaft (1), and the coupling means comprise a first switchable coupling (11; 72 ,76, 77) between the compressor shaft and the turbine shaft.

6. Turbine according to claim 1, wherein the compressor comprises a compressor shaft (12) for moving one or more pistons (17; 54) and the coupling means comprise a second switchable coupling (15) between the compressor shaft and one or more pistons.

7. Turbine according to claim 1, wherein the drive means comprise at least one cam (62,63) rotated by the turbine and a cam follower (41,42,50) driven by the cam for moving a piston (17; 54) whereby the cam is designed such that the piston reciprocates at least two times for every rotation of the compressor shaft (12).

8. Turbine according to claim 7 wherein the cam (62,63) is designed such that the piston (17; 54) reciprocates at least three times for every rotation of the compressor shaft (12).

9. Turbine according to claim 7, wherein a second cam (62,63) rotating with the first cam (62,63) cooperates with a second cam follower 41,42,50) for pulling a piston (17; 54) towards the bottom dead centre (BDC) position.

10. Turbine according to claim 9 wherein an oscillating bracket (50) comprises the first cam follower (41,42) and the second cam follower and the second coupling (15) is mounted between the oscillating bracket and the piston(s) (17;54).

11. Turbine according to claim 7, wherein a cam (62,63) has a constant radius over part of its circumference at its largest radius and/or its smallest radius.

12. Turbine according to claim 7, wherein the cam(s) (62, 63) is/are shaped such that the reciprocal movement of the piston (54) when enlarging the volume of the compression chamber (55) requires more rotation of the cam than when reducing the volume of the compression chamber.

13. Turbine according to claim 1, wherein the drive means comprise a spring (106) for moving a piston (54) towards a bottom dead centre (BDC).

14. Turbine according to claim 13, wherein the coupling means comprise a lock (114) for preventing a piston (54) to move from the top dead centre (TDC) towards the bottom dead centre (BDC).

15. Turbine according to claim 1, wherein the drive means comprise a compressor shaft (12) for moving one or more pistons (54) and turning means for incidentally rotating the compressor shaft at slow speed.

16. Turbine according to claim 1, wherein the compressor shaft (12) and piston(s) (17;54) are mounted in a gas tight enclosure (51) that has a magnetically inert ring shaped part

(70) and the turbine drives the compressor shaft (12) via a magnetic coupling (5, 6; 97, 98) acting through the magnetically inert ring shaped part.

17. Turbine according to claim 16 wherein the magnetic coupling (5, 6; 97, 98) has two rings of permanent magnets (97,98) at both sides of the magnetically inert ring shaped part (70) and the first switchable coupling comprises actuating means that axially displaces in two positions either one of the rings of permanent magnets or a metallic bush between the two rings of permanent magnets.

18. Turbine according to claim 16, wherein a ring of permanent magnets (71) rotates with the turbine and generates electric power in a coil (7) whenever the turbine rotates.

19. Turbine driving a power conversion means, the power conversion means comprising several and preferably more than three power conversion units, preferably of approximately similar power conversion capacity, that have coupling means for coupling the power conversion units to the turbine, the turbine having measuring means for determining the rotation speed of the turbine and/or a flow speed of the turbine driving flow of wind or water and a control system for controlling the coupling means in dependence of the determined rotation speed and/or flow speed characterized in that the control system has means for activating and deactivating the coupling means the for the different power conversion units so that the power conversion units are used equally, wherein the power conversion unit comprises a compressor with a compression chamber (55) at one side limited by a piston (17;54) and drive means (12,14,16) for moving the piston reciprocatingly in the compression chamber between a top dead centre position (TDC) and a bottom dead centre position (BDC), and the coupling means (11; 15) couple and decouple the rotation of the turbine and the reciprocating movement of one or more pistons (17;54), and wherein the compressor shaft (12) and piston (s) (17;54) are mounted in a gas tight enclosure (51) that has a magnetically inert ring shaped part (70) and the turbine drives the compressor shaft (12) via a magnetic coupling (5, 6; 97, 98) acting through the magnetically inert ring shaped part.

* * * * *